US006942416B2

(12) United States Patent
Karlsson

(10) Patent No.: US 6,942,416 B2
(45) Date of Patent: Sep. 13, 2005

(54) DEVICE FOR ATTACHING A HANDLE

(75) Inventor: Göte Karlsson, Huskvarna (SE)

(73) Assignee: Aktiebolaget Electrolux, Stockholm (SE)

(*) Notice: Subject to any disclaimer, the term of this patent is extended or adjusted under 35 U.S.C. 154(b) by 0 days.

(21) Appl. No.: 10/074,985

(22) Filed: Feb. 13, 2002

(65) Prior Publication Data

US 2002/0110410 A1 Aug. 15, 2002

(30) Foreign Application Priority Data

Feb. 15, 2001 (SE) .............................................. 0100499

(51) Int. Cl.[7] .................................................. F16D 1/00

(52) U.S. Cl. .......................... 403/84; 403/237; 403/385

(58) Field of Search .......................... 16/405, 406, 422, 16/426, 427, 428, DIG. 24, DIG. 25, 429; 403/52, 84, 234, 237, 389, 384, 391, 385, DIG. 9, 387; 30/296.1, 298, 398

(56) References Cited

U.S. PATENT DOCUMENTS

| | | | | |
|---|---|---|---|---|
| 2,697,457 A | * 12/1954 | Lawrence | 30/276 |
| 3,581,832 A | * 6/1971 | Heermann et al. | 30/167 X |
| 4,145,810 A | * 3/1979 | Belliston | 30/296 R |
| 4,175,298 A | 11/1979 | Muller et al. | 7/138 |
| 4,188,719 A | 2/1980 | Hoff | 30/122 |
| 4,226,021 A | * 10/1980 | Hoff | 30/276 |
| 4,282,652 A | * 8/1981 | Ballas, Sr. | 30/276 |
| 4,359,822 A | * 11/1982 | Kolodziejczyk | 20/296 R |
| D333,954 S | * 3/1993 | Karlsson et al. | D8/8 |
| 5,899,627 A | * 5/1999 | Dobrovolny | 403/391 |
| 6,056,668 A | * 5/2000 | Nagashima | 477/207 |
| 6,105,985 A | * 8/2000 | Cosgrave | 280/248 |
| 6,240,644 B1 | * 6/2001 | Lawrence | 30/276 |
| 6,584,872 B1 | * 7/2003 | Kojima | 74/551.8 |
| 6,612,597 B2 | * 9/2003 | Baker et al. | 280/204 |
| 6,736,414 B2 | * 5/2004 | Farrally-Plourde | 280/16 |
| 2002/0094234 A1 | * 7/2002 | Shaw | |
| 2002/0104193 A1 | * 8/2002 | Warashina et al. | |
| 2004/0066019 A1 | * 4/2004 | Yamabe | |
| 2004/0075227 A1 | * 4/2004 | Jungnickel | |

* cited by examiner

*Primary Examiner*—William L. Miller
*Assistant Examiner*—Ruth C. Rodriguez
(74) *Attorney, Agent, or Firm*—Pearne & Gordon LLP

(57) ABSTRACT

A device for attaching a handle or handlebar to a portable tool to be adjustable about two parallel axes in order to increase the range for the adjustments of position of the handle or handlebar relative to the tool. The device can also be used with existing tools.

6 Claims, 3 Drawing Sheets

DEVICE FOR ATTACHING A HANDLE

BACKGROUND OF THE INVENTION

The present invention relates to a device for attaching a handle or a handlebar to a portable tool with the cutting head placed in the end of a pole or shaft, such as a clearing saw, a cord trimmer or a hedge trimmer.

Different types of engine-powered portable tools, such as clearing saws, rotary trimmers and hedge trimmers, are widely used for work in gardens and forests. In order to facilitate the work even more is it important to improve the ergonomic design of the tool so that the tool will fit the operator even though the working conditions changes and the fact that different operators have different physical conditions.

One area of specific importance relates to attaching of the handle or handlebar to tools provided with an engine at one end of a pole or shaft and a cutting head placed at the other end of the pole or shaft. The length of the pole is different for different types of tools depending on the work that the tool is intended to do. These types of tools improve the working conditions for the operator since the tool design increases the range that is reachable for the operator.

There are a couple of different approaches known that enable the operator to adjust the handle or the handlebar so that the working conditions for the operator are optimized.

One approach is described in U.S. Pat. No. 4,188,719 in which the handle is slidable along the pole so that the handle can be fastened in a selected position. This approach has the drawback that it is only possible to adjust the position of the handle in one direction, along the pole.

Another approach is illustrated in U.S. Design Pat. No. 333,954 and U.S. Pat. No. 4,175,298. In order to make it possible to optimize the working conditions for the operator, the handle or handlebar is rotatable within the fastening device of the tool.

The handle or handlebar is then fastened in a selected position. This approach has the drawback that it allows the operator to select the height of the handle relative the tool but only makes it possible to make marginal adjustments in the axial direction along the pole. The handle can also be moved to a position suitable for transport with the handle parallel to the pole.

It is therefor desirable to increase the flexibility of the tools so that the operator will have a better opportunity to adjust the tool so that it will fit the operator, as well as the working conditions, as well as possible.

BRIEF SUMMARY OF THE INVENTION

The present invention that is described in this application solves this problem without substantial changes in the construction and design of existing tools.

The new approach, as described in detail hereinafter, makes it possible for the operator to adjust the position of the handle or handlebar in an axial direction along the pole as well as to adjust the height of the handle in relation to the pole and the tool. The handle or the handlebar can also slide sideways in the fastening device if desirable for the operator.

The present invention also makes it possible to retrofit existing tools. This could be done by using a single accessory that fits existing tools.

BRIEF DESCRIPTION OF THE SEVERAL VIEWS OF THE DRAWING

One embodiment of the present invention is illustrated in the attached drawings and described in relation to the drawings, whereas

DETAILED DESCRIPTION OF THE INVENTION

Figure 1:
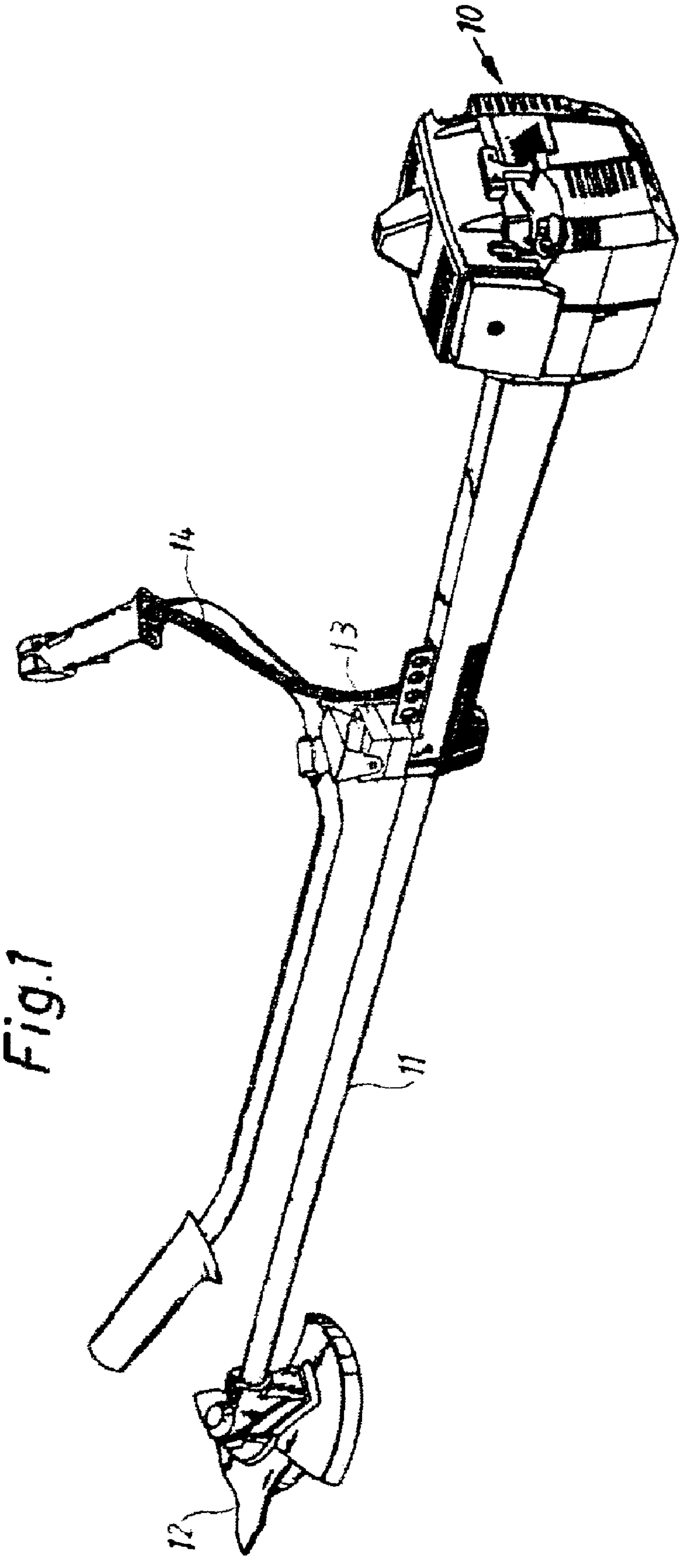
FIG. 1 shows a portable tool having a device for attaching the handle or handlebar to the tool according to the present invention.

As shown in FIG. 1, a tool according the present invention includes an engine 10, as well as all necessary equipment for the running of the engine 10, mounted at one end of a shaft or a pole 11. A cutting head 12 is located at the other end of the shaft or pole 11. The cutting head 12 can be shaped in different ways depending on what kind of work the tool is designed for. The cutting head 12 could, for example, be a clearing saw or a trimmer head having a filament. A holder 13 for a handle or a handlebar 14 attached to the shaft or pole 11. The handle or the handlebar is normally equipped with different instruments for control of the engine. The holder 13 can be rotated into a position where the handle is parallel with the pole in order to make it easier to store and transport the tool.

Figure 2:
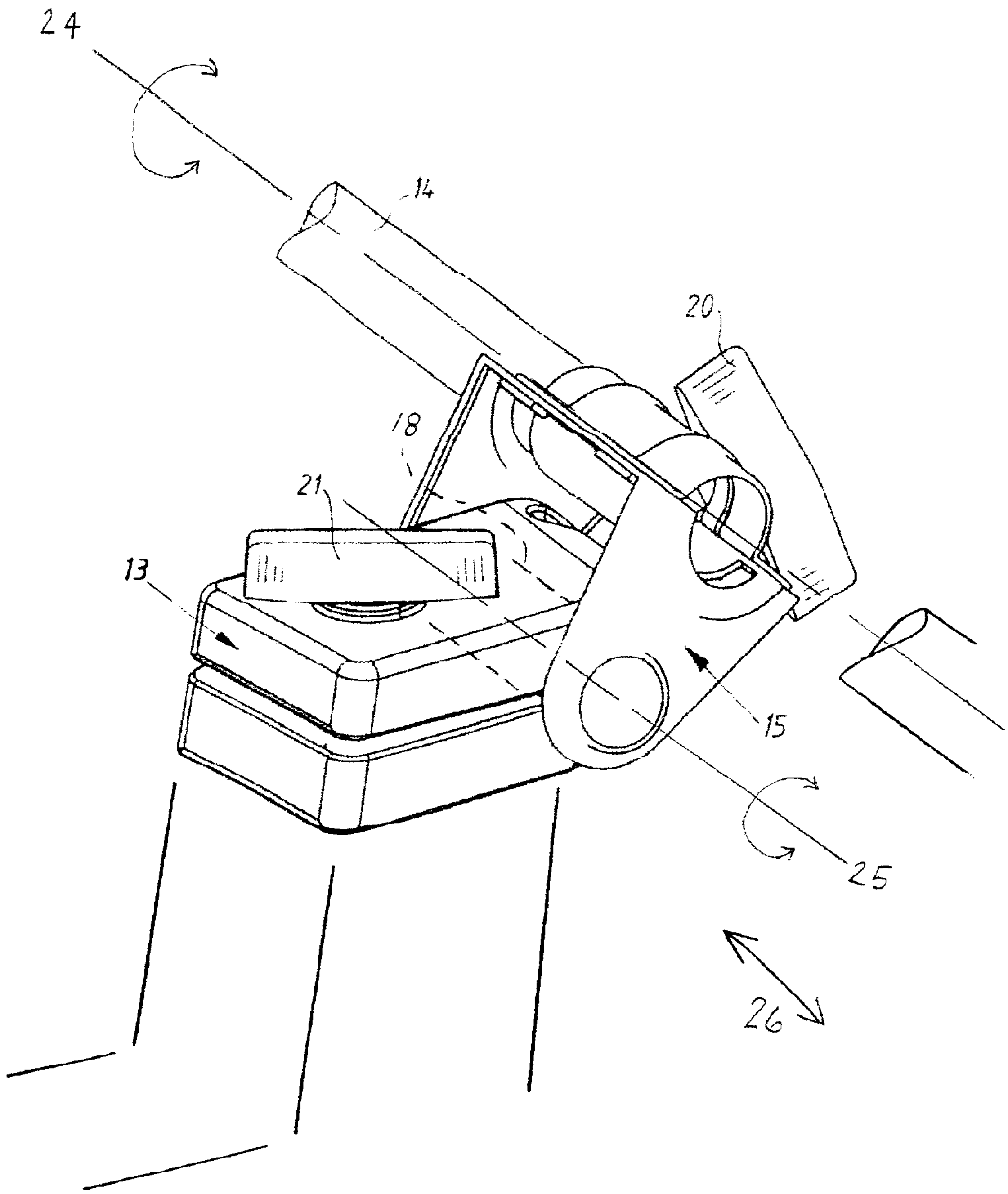
FIG. 2 shows the device for attaching the handle or the handlebar to the tool of FIG. 1.

As shown in FIG. 2, in order to increase the adjustability of the handle or handlebar 14, the tool provided with an arm 15 that is placed between the handlebar 14 and the holder 13. This arm 15 is rotatable within the holder 13 and thus permits adjustment of the handle or handlebar 14 in relation to the tool in an axial direction along the pole 12 and of the height of the handle or handlebar 14 above the pole 12. The length of the arm 15 regulates or determines the range over which the handle or handlebar 14 can be adjusted. The length of the arm 15 can therefor be selected to match the operator's need for adjustments.

Figure 3:
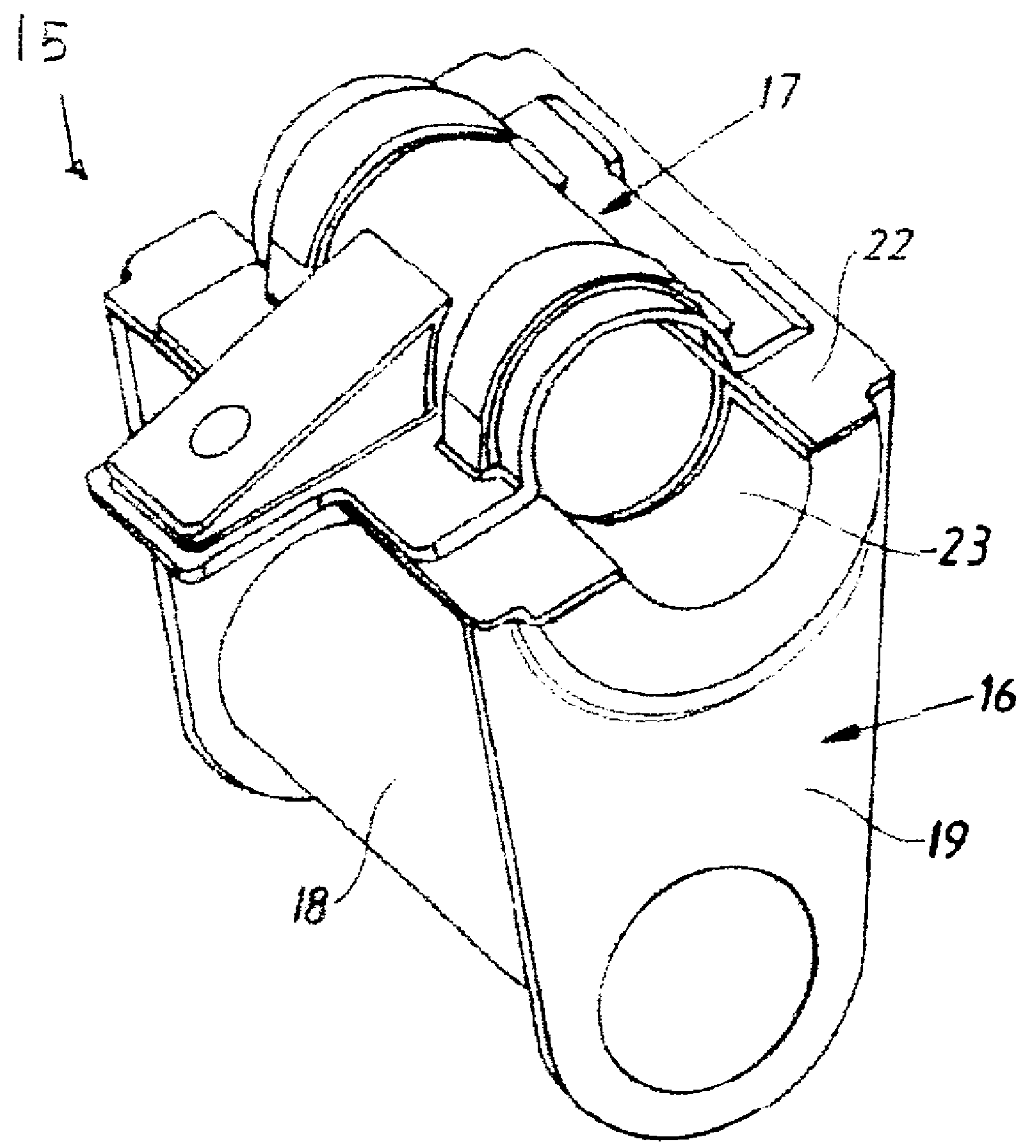
FIG. 3 shows an arm of the device of FIG. 1, being detached for clarity.

As shown in FIG. 3, the arm 15 comprises a lower part 16 and an upper part 17 that secures the handle or handlebar 14 to the lower part 16 and to the tool. The lower part 16 includes a cylindrical axle 18 that is placed in the holder 13. Referring to FIG. 2, the holder 13 comprises two plate-shaped halves with a cylindrical groove in-between. The axle 18 fits in the groove between the plate-shaped halves that are secured to each other with a screw 21. The screw 21 also secures the axle 18 in a user-selected position.

As best shown by FIGS. 1 and 2, this construction makes it possible for the arm 15 to rotate around or pivot about an axis 25 close to or perpendicular to the axial direction of the shaft or pole 11. The axis 25 that the arm 15 rotates around is normally separated by between 5 and 15 degrees from the perpendicular direction relative the axial direction of the shaft or pole 11 in order to place the cutting head 12 in front of the operator during normal use of the tool. The shaft or pole 11 is, during normal use, supported against the hip of the operator. The angle of the axis 25 that the arm 15 rotates around can be changed as necessary in order to improve the working condition for the operator.

The axle 18 has in both ends perpendicular support arms 19. In the ends of the support arms 19 facing away from the axle 18 is a plate 22 fastened to the support arms 19 so that the plate 22 is running in parallel direction as the axle 18. The plate 22 has a semicylindrical groove 23 running in the same axial direction as the axle 18. The semicylindrical groove 23 is shaped so that the handle or handlebar 14 fits in the half cylindrical groove 23. The handle or handlebar 14 is secured to the lower part 16 by an upper part 17 that is placed so that the handle or handlebar 14 is clamped between the lower part 16 and the upper part 17 by a screw 20.

The axis 24 between the lower part 16 and the upper part 17 about which the handle or handlebar 14 can rotate is alternately referred to herein as the "first axis". The axis 25 in the holder 13 about which the arm 15 can rotate is alternately referred to herein as the "second axis."

The handle or handlebar 14 fastened between the lower part 16 and the upper part 17 makes it possible for the handle or the handlebar 14 to slide sideways 26 to the operator's desired position.

What is claimed is:

1. A Device for attaching a handle to a holder fastened to a portable tool, comprising:

a lower part comprising a semicylindrical groove for accommodating the handle "an axle and a pair of arms; the pair of arms attaching the semicylindrical groove to the axle";

an upper part that keeps the handle in the groove on the lower part;

a screw fastening the upper part to the lower part so that the handle can be secured in a selected position;

a holder for attachment to the portable tool, and the axle of the lower part being received within the holder for attachment of the handle to the portable tool so that the handle can be turned around a first axis, wherein the first axis is pivotable about a second axis located in the holder on the tool, and wherein the second axis is parallel to the first axis.

2. A device according to claim 1, wherein an axial direction of the groove is parallel to an axial direction of the axle.

3. A device according to claim 2, wherein the axial direction of the axle is the same as the second axis that the handle turns around.

4. A device according to claim 2, wherein the length of the arm determines a range for adjustment of the handle in an axial direction along the tool and a height above the tool.

5. A device according to claim 1, wherein a length of the arm determines a range for adjustment of the handle in an axial direction along the tool and a height above the tool.

6. A device according to claim 1, wherein the holder comprises two jaws connected by a screw so that the axle can be secured between the jaws in a selected position.

* * * * *

UNITED STATES PATENT AND TRADEMARK OFFICE

CERTIFICATE OF CORRECTION

PATENT NO. : 6,942,416 B2
DATED : September 13, 2005
INVENTOR(S) : Karlsson

It is certified that error appears in the above-identified patent and that said Letters Patent is hereby corrected as shown below:

<u>Column 3,</u>
Line 14, please delete "handle "an" and insert therefor -- handle, an --.
Line 16, please delete "axle";" and insert therefor -- axle; --.

Signed and Sealed this

Eighth Day of November, 2005

JON W. DUDAS
*Director of the United States Patent and Trademark Office*